(12) United States Patent
Obrachta et al.

(10) Patent No.: US 6,810,599 B2
(45) Date of Patent: Nov. 2, 2004

(54) PIN TIP SHARPNESS MEASUREMENT GAUGE

(75) Inventors: Kevin L. Obrachta, Wichita, KS (US); Robert Nelson, Wichita, KS (US); Richard J. Meusborn, Wichita, KS (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/188,201

(22) Filed: Jul. 1, 2002

(65) Prior Publication Data

US 2004/0000065 A1 Jan. 1, 2004

(51) Int. Cl.[7] .............................................. G01B 3/56
(52) U.S. Cl. ............................ 33/532; 33/531; 33/833; 33/555.1
(58) Field of Search ........................ 33/833, 832, 531, 33/555.1, 532, 555.3; 73/104

(56) References Cited

U.S. PATENT DOCUMENTS

| | | | | |
|---|---|---|---|---|
| 2,642,670 A | * | 6/1953 | Dow | 33/832 |
| 2,975,524 A | * | 3/1961 | Field | 33/534 |
| 3,902,358 A | * | 9/1975 | Moore | 73/104 |
| 4,360,973 A | * | 11/1982 | McMurtry | 33/833 |
| 4,736,313 A | * | 4/1988 | Nishimura et al. | 33/819 |
| 4,905,378 A | * | 3/1990 | Culver et al. | 33/833 |
| 5,181,416 A | * | 1/1993 | Evans | 73/104 |
| 5,337,488 A | * | 8/1994 | Lemelson | 33/784 |
| 5,379,633 A | * | 1/1995 | Flisram et al. | 73/104 |
| 5,571,956 A | * | 11/1996 | Sargent | 73/104 |
| 5,625,958 A | * | 5/1997 | DeCoursey et al. | 33/833 |
| 6,415,526 B1 | * | 7/2002 | Buckner et al. | 33/833 |
| 6,446,348 B1 | * | 9/2002 | Brian | 33/532 |

* cited by examiner

Primary Examiner—Christopher W. Fulton
Assistant Examiner—Amanda J Hoolahan
(74) Attorney, Agent, or Firm—Black Lowe & Graham PLLC; Mark S. Beaufait

(57) ABSTRACT

A method and a gauge for measuring the sharpness of the tip of an object is provided. The method includes receiving the tip of the measured object in the end of a tube. The object deflects a plunger inside the tube a finite distance proportional to the sharpness of the object inserted in the tube. A measurement of sharpness of the tip of the object is derived by measuring the deflection distance of the plunger. The measuring method may be used to measure the sharpness of a number of objects in sequence by displaying the sharpness of the object, such as where the objects being measured are pins arranged in a matrix pattern.

23 Claims, 3 Drawing Sheets

US 6,810,599 B2

PIN TIP SHARPNESS MEASUREMENT GAUGE

FIELD OF THE INVENTION

This invention relates generally to measurement systems and, more specifically, to a method and gauge for measuring sharpness.

BACKGROUND OF THE INVENTION

Form mats with grids of sharp pins are used for forming acoustical surfaces in many applications, including aircraft engine cowls. These pin mats perforate the material being fabricated during lay-up and curing, forming an acoustically dampening surface. The pins on the pin mats are typically quite small and closely spaced. The mats often have more than 100 pins per square inch. If the pins are dull, they do not perforate the material being formed, resulting in a defective acoustical surface. While a certain percentage of perforation failures are acceptable, a large number of pin failures results in the formed material being rejected.

Pin mats are typically manufactured by injection molding (not shown), but may be manufactured by other methods. In injection molding, the pin mat mold has vents which allow air to exit as the plastic is injected into the mold. If a vent is clogged or if an injection port is restricted during the filling stage of the injection process, which takes approximately 3 seconds, pins in part of the mat may not be properly formed. Each pin is typically molded with a conical tip. The nature of the injected polypropylene is such that the tip of each pin, as plastic is injected into the conical pin voids in the pin mat mold, forms a cone up to a certain distance from the tip, and then becomes spherical. Variations in the molding process parameters of the pins cause the conical portion of the pin to be filled to a varying degree. The molded polypropylene then forms a spherical radius at the tip of each molded pin, with varying radii. The smaller the spherical radius at the tip of a pin, the sharper the pin. The larger the pin tip radius, the duller the pin.

A dull pin will buckle or fail when the pin mat holding the pin is pressed against or into composite materials being molded with an acoustical surface. Typically, the pin mats are used only once. The composite materials being formed are cured with the pin mat in place. Removal of the pin mat typically results in distortion of the pins, preventing reuse of the pin mat. Multiple mats are often used in the forming of composite components, such as the inner walls for the engine ducts on commercial aircraft.

Pin failures are directly related to pin tip sharpness. A dull pin will not perforate the material being formed, while a sharp pin will. Historically, pin tip sharpness has been measured indirectly. The pin mats are used in a forming process, and are rejected when the formed materials are improperly perforated. Composite materials used in forming special shapes, especially for aircraft parts, are expensive and involve substantial lay-up time. The rejection of formed composite pieces due to inadequate pin tip sharpness can be quite expensive.

Other prior methods of pin tip sharpness measurement include optical inspection and the use of a coordinate measuring machine. Optical inspection, pin by pin, such as by using a magnifier, is time consuming, and involves observer subjectivity, or at minimum, the potential for observer error. Direct coordinate measuring of pins, such as by a laser coordinate measuring machine, is very accurate, measuring surface differences down to 0.001 inch, but is very slow. It takes a considerable amount of time to coordinate measure even a single pin, let alone a large sample of pins to permit the grading of a pin mat used for forming composites.

Therefore, a need exists for quickly and easily measuring the sharpness of objects, especially pin tip sharpness.

SUMMARY OF THE INVENTION

A method and a gauge for measuring the sharpness of an object is provided. The method includes receiving the tip of the object to be measured in the end of a tube. The object deflects a plunger in the tube a finite distance proportional to the sharpness of the object inserted in the tube. Measuring the sharpness of the tip of the object is accomplished by measuring the deflection distance of the plunger, and deriving the sharpness from the deflection distance. The sharpness of the object is then displayed. The measuring method is used to quickly measure the sharpness of a number of objects in sequence, such as where the objects being measured are pins arranged in a matrix pattern.

According to an aspect of the invention, a gauge for measuring the sharpness of the tip of an object includes a tube having an opening at an end of the tube and the opening is defined to receive the tip of an object. A plunger is disposed inside the tube, and the plunger is deflected a finite distance inside the tube when the tip of the object is inserted into the tube. The gauge has a means for displaying the sharpness of the object.

According to another aspect of the invention, the present invention also provides a method for sampling the sharpness of pins on a pin mat used for forming composite or molded materials. The method and the gauge of the present invention may be used to sample a predetermined set of pins in a forming mat, and displaying the sharpness measurements directly, or compiling the sharpness measurements into a sharpness map used for grading the pin mat. The invention provides a rapid method of measuring the sharpness of objects, especially multiple objects, and rapidly displaying and mapping the results of such measurements. The present invention allows rapid assessment of pin tip sharpness prior to the use of pin mats for forming composite or molded materials. This can substantially reduce rejection of formed materials due to improper pin tip sharpness in the pin mats.

BRIEF DESCRIPTION OF THE DRAWINGS

The preferred and alternative embodiments of the present invention are described in detail below with reference to the following drawings.

DETAILED DESCRIPTION OF THE INVENTION

By way of overview, a method and a gauge for measuring the sharpness of an object is provided. The method includes receiving the tip of the measured object in the end of a tube. The object deflects a plunger in the tube a finite distance proportional to the sharpness of the object inserted in the tube. A measurement of sharpness of the tip of the object is derived by measuring the deflection distance of the plunger. The measuring method may be used to measure the sharpness of a number of objects in sequence by displaying the sharpness of the object, and then repeating the method, for example where the objects being measured are pins arranged in a matrix pattern.

Figure 1:
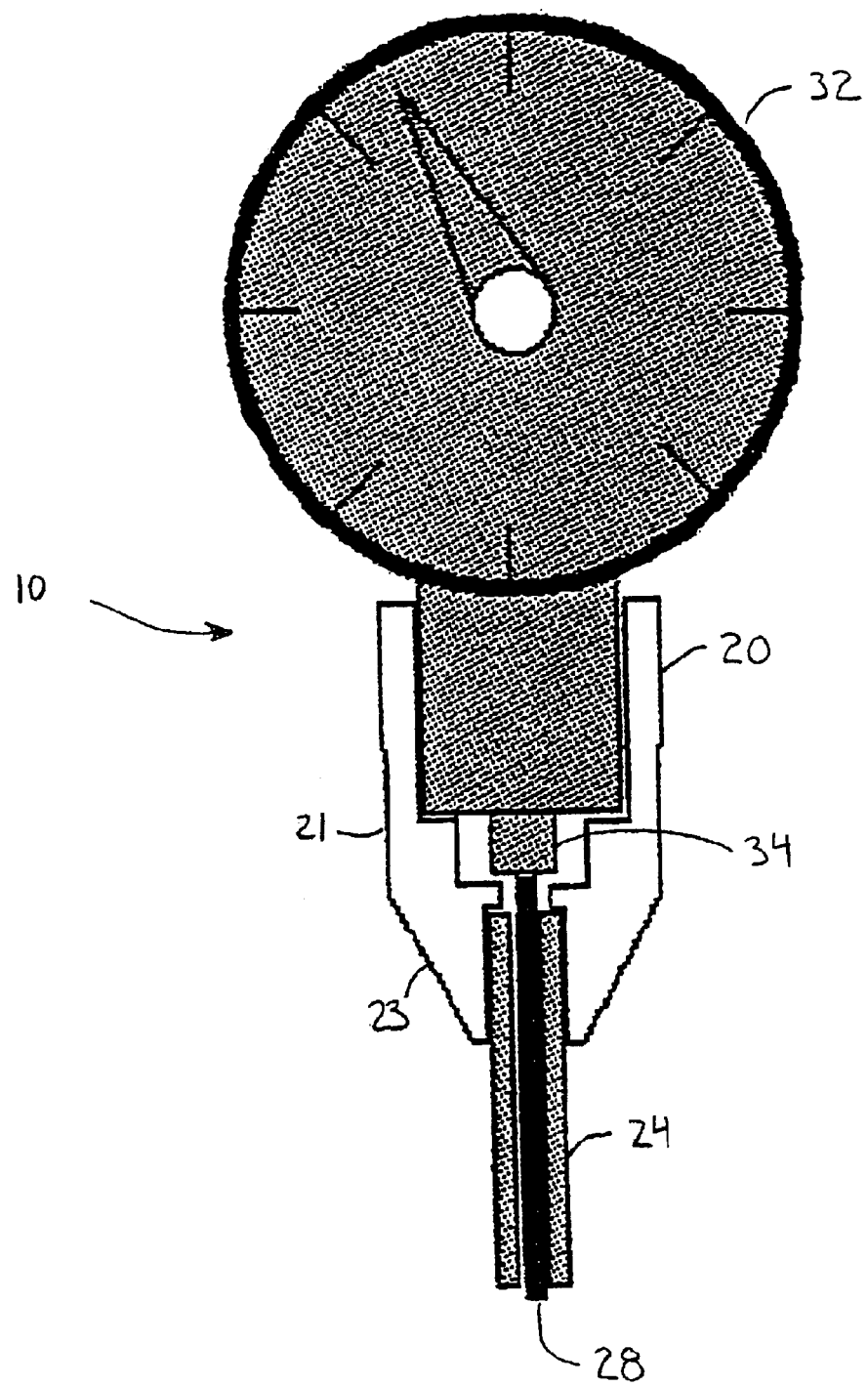
FIG. 1 is a diagram of an example analog gauge embodiment of the present invention.

FIG. 1 illustrates an example sharpness measurement gauge 10 of the present invention incorporating an analog dial display. The sharpness measurement gauge 10 includes an aperture tube 24 held by a body 20, shown in cross-section. The body 20 includes a cylindrical section 21, and a tapered section 23 that tapers down to the diameter of the aperture tube 24. The aperture tube 24 is inserted in the lower end of the body 20. It will be appreciated that any suitable shape of the body 20, including shapes designed to be hand-held, such as knurled or hexagonal shapes, or designed to be machine-held, such as externally threaded or notched, may be utilized. An end of the cylindrical section 21 is suitably shaped to receive a dial indicator 32, typically a dial indicator depth gauge. In one embodiment, given by way of non-limiting example, the dial indicator depth gauge is a MITUTOYO dial depth gauge.

The aperture tube 24 of the sharpness measurement gauge 10 contains a plunger 28. The outside diameter of the plunger 28 is slightly smaller than the inside diameter of the aperture tube 24, allowing the plunger tube to slide within the aperture tube 24. The inside diameter of the aperture tube is fixed and precisely known. When the sharpness measurement gauge 10 is pressed against an object (not shown) being measured for sharpness, the plunger 28 is deflected by the object into the aperture tube 24. It will be appreciated that the sharpness aperture gauge 10 may be held and used at any suitable angle or orientation, and need not be solely held vertically. A holder (not shown) suitably may be used to hold the gauge 10 in a specific orientation to the surface holding the objects being measured for sharpness. Similarly, a tube or cone shaped guide tip (not shown), with a larger diameter than the aperture tube 24, suitably may be attached over the open end of the aperture tube 24 to assist proper placement of the gauge 10 over the object being measured for sharpness.

The plunger 28 extends from the lower or distal end of the aperture tube 24 through the aperture tube 24 and into the body 20 of the sharpness measurement gauge. Inside the body 20, the plunger 28 engages an indicator actuator 34 of a dial indicator 32. The dial indicator 32 is held by the upper end of the body 20. Pressing the aperture tube 24 and the plunger 28 of the sharpness measurement gauge 10 against an object (not shown) to conduct a sharpness measurement results in the deflection of the plunger 28 inside the aperture tube 24 moving the indicator actuator 34 of the dial indicator 32. The dial indicator 32 then directly indicates the deflection caused by the object, or through a suitable display scale on the dial indicator 32, displays sharpness of the object being measured. The plunger 28 may engage the indicator actuator 34 by any suitable connection, including simple contact. For example, the plunger 28 presses against the indicator actuator 34, deflecting indicator actuator 34 and thus changing the display on the dial on the dial indicator 32.

It will be appreciated that any suitable method or indicator for detecting or reading the deflection of the plunger 28 inside the aperture tube 24 may be used when the present invention measures the sharpness of the object. By way of example, electrical or optical measuring systems can measure deflection of the plunger 28. Suitably shaped aperture tubes 24 and correspondingly shaped plungers 28 can measure the sharpness of different shaped objects. For example, a shaped aperture tube 24 and a matching plunger 28 would measure the sharpness of shaped item, such as a fish hook.

The present invention with a cylindrical aperture tube 24 and a cylindrical plunger 28 can also measure the sharpness of non-conical objects. For example, a non-conical tipped pin would produce a standard plunger deflection when the present invention with a cylindrical aperture tube 24 is placed over such an object. Further, the distal end of the aperture tube 28 may be cut or manufactured in any shape conforming to the object being measured for sharpness. In the example guage shown in FIG. 1, the distal end of the aperture tube 24 is cut square. Any suitable shape of the distal end of the aperture tube 28 may be utilized that results in consistent deflection of the plunger 28 for a particular degree of sharpness when the guage receives the object being measured. By way of example, but not limitation, a notched distal end of the aperture tube 24 would measure the sharpness of the tip of an edge or corner of an object. Thus, the method and gauge of the present invention are not limited to sharpness measurements of conically tipped objects.

It will also be appreciated that any suitable method may be utilized to "zero" or otherwise calibrate or establish a fixed reference from which to measure the deflection of the plunger 28 within the aperture tube 24. For example, the guage of the present invention may be placed against a known flat surface, and the dial indicator 32 set to zero, calibrating the guage, prior to measurement of the sharpness of an object.

Figure 2:
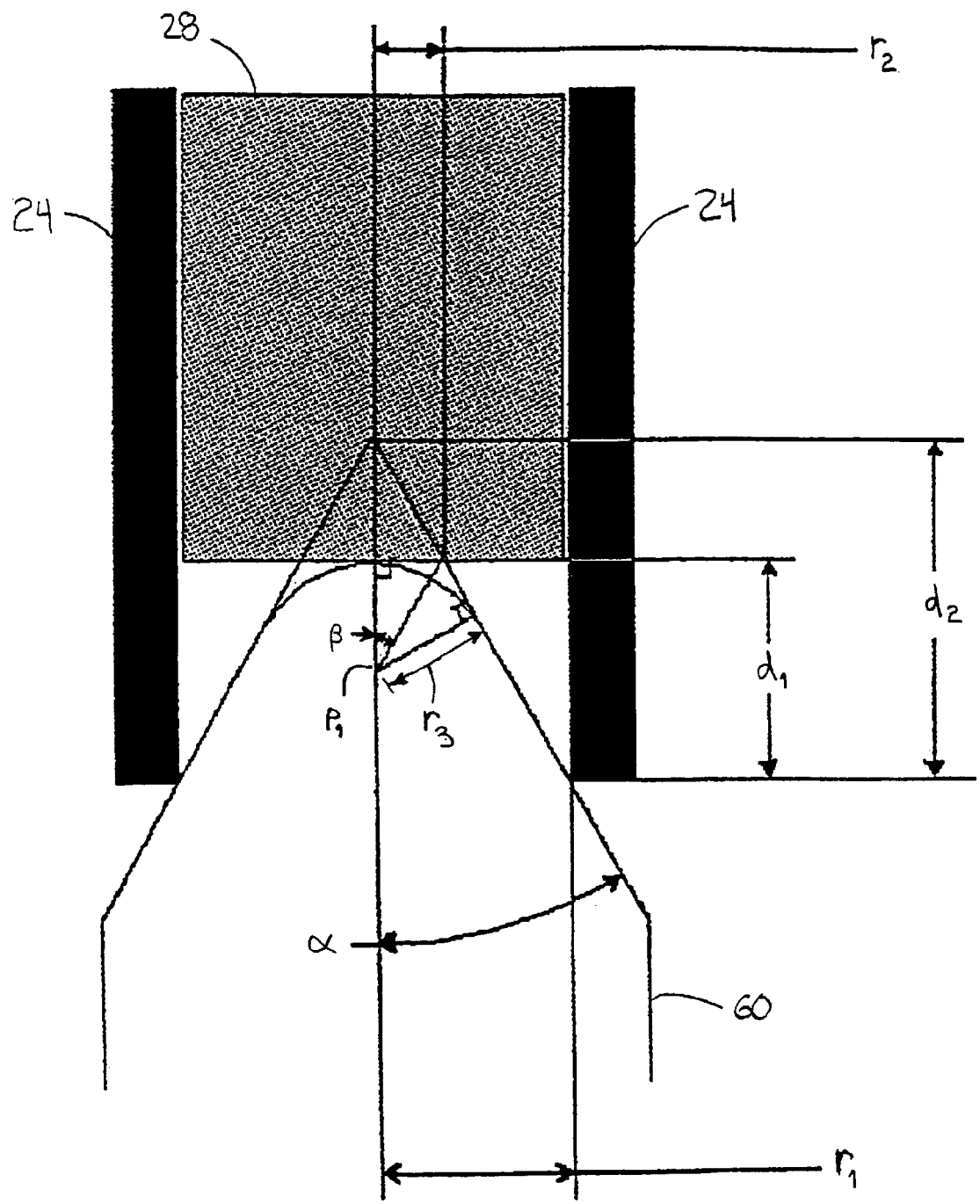
FIG. 2 is a diagram illustrating the derivation of object sharpness by the present invention.

FIG. 2 is a cross-section of the aperture tube 24 and plunger 28 of the present invention, showing the derivation of the sharpness of an object being measured by the present invention. The plunger 28 slides within the aperture tube 24. The plunger 28 is deflected within the aperture tube 24 by the object being measured for sharpness, in this instance, the tip of a pin 60. The aperture tube 24 rests on the sides of the pin tip. The pin 60 is a single pin in this instance is from a pin mat (not shown) used for forming molded or composite materials with perforated acoustical surfaces. Given by way of non-limiting example, the pin is suitably made of polypropylene mixed with 20% talc. The pin 60 is manufactured as part of the pin mat (not shown). Typical pin mats are approximately 27 inches by 43 inches, and contain between about 55 and about 111 pins per square inch. A typical pin has a diameter of about 0.04 inch and is spaced from its adjacent pins by approximately 0.1 inch. The pin 60 is approximately 0.125 inches long.

FIG. 2 shows the cross-section of a single pin 60 with a conical/spherical tip, inserted into the aperture tube 24 of the present invention deflecting the plunger 28. The aperture tube 24 rests on the sides of the pin tip. The pin 60 has a conical pin tip angle $\alpha$. At the tip of the pin 60, the pin has a spherical pin tip radius $r_3$. The pin tip radius $r_3$ is the dimension desired to be obtained by the present invention.

The aperture tube 24 in which the pin 60 is inserted has an inside aperture radius $r_1$. When the pin 60 is inserted into the aperture tube as deeply as possible, the cone shaped tip of the pin 60 deflects the plunger 28 by a plunger deflection distance $d_1$, which equals the distance the tip projects into the aperture tube 24, from where it rests on the sides of the pin tip. From the aperture radius $r_1$, the pin tip angle $\alpha$, and the plunger deflection distance $d_1$, the desired pin tip radius $r_3$ may be derived.

The derivation of the pin tip radius $r_3$ utilizes three derived dimensions. The pin, were it to have a perfectly sharp completely conical tip, would project into the aperture tube a projected pin depth distance $d_2$. The projected pin depth $d_2$, first derived dimension, is equal to the aperture radius $r_1$ divided by the tangent of the pin tip angle α (All angles are in degrees). From the pin tip angle α, the plunger deflection $d_1$, and the derived projected pin depth $d_2$, a tip projection radius for a hypothetical flat pin tip (assuming the pin tip cone had a flat tip rather than a spherical tip), may be derived. The tip projection radius $r_2$ for the circular tip of such a flat tipped pin is equal to the tangent of the pin tip angle α times the difference between the projected pin depth $d_2$ and the plunger deflection $d_1$. A third derived dimension, a tip projection angle β, is an angle defined by the center line of the pin 60 and a cone projecting from the center of the spherical tip of the pin $p_1$ and the circle scribed by the derived tip projection radius $r_2$ and is derived by subtracting α from 90° and dividing the distance by two. The desired pin tip radius, $r_3$, is thus the tip projection radius $r_2$ divided by the tangent of the tip projection angle β.

In equation form:

$$d_2 = r_1/\tan \alpha \quad (1)$$

$$r_2 = \tan \alpha * (d_2 - d_1) \quad (2)$$

$$\beta = (90 - \alpha)/2, \text{ and therefore} \quad (3)$$

$$r_3 = r_2/\tan \beta, \quad (4)$$

where,

α=pin tip angle;
β=tip projection angle;
$r_1$=aperture radius;
$r_2$=tip projection radius;
$r_3$=pin tip radius;
$d_1$=plunger deflection;
$d_2$=projected pin depth; and
$p_1$=spherical tip center.

The pin tip radius $r_3$ is displayed by the present invention indirectly through displaying the plunger deflection distance $d_1$ through a display scale on the dial indicator indicating $r_3$ the pin tip radius, or by converting the plunger deflection $d_1$ to a digital display of $r_3$ the pin tip radius using a digital indicator.

Figure 3:
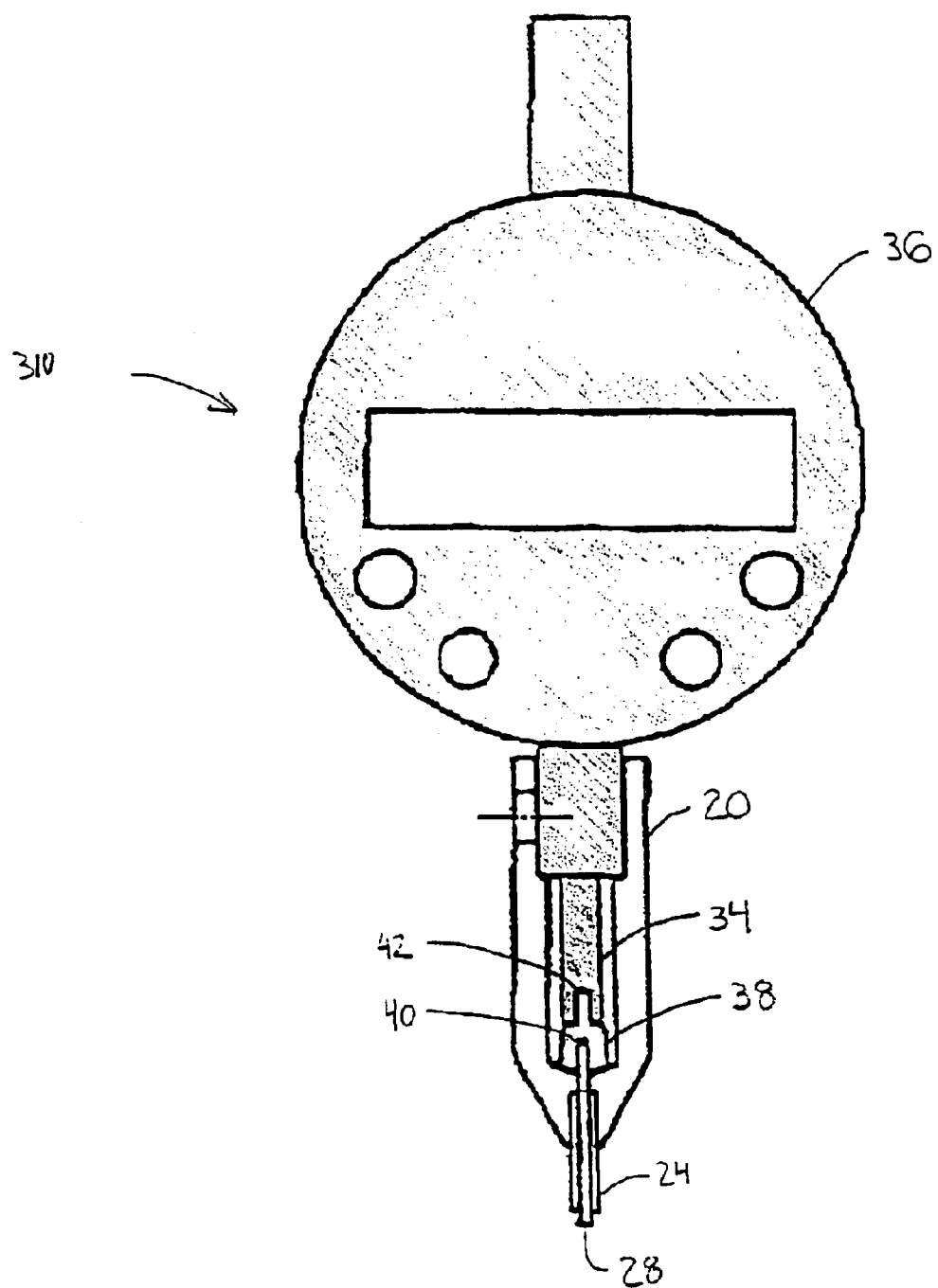
FIG. 3 is a diagram of an example digital gauge embodiment of the present invention.

FIG. 3 is a cross-section drawing of a digital sharpness measurement gauge 310 of the present invention. The digital sharpness measurement gauge 310 has a body 20 holding at its lower end the aperture tube 24. The aperture tube 24 has a plunger 28 that slides within the aperture tube 24. The plunger 28 is deflected by an object when the sharpness of the object (not shown) is being measured by the gauge. Deflection of the plunger 28 moves a contact 38 which in turn moves the indicator actuator 34 of a digital depth indicator 36. The contact 38 moves within the body 20 and has a socket 40 that receives the upper end of the plunger 28, and an indicator connection 42 that connects to the actuator indicator 34 of a the digital depth indicator 36. In a present embodiment of the digital sharpness measurement gauge 310, digital depth indicator 36 is suitably a MITUTOYO DIGIMATIC indicator. The DIGIMATIC indicator has a digital output (not shown) which also permits downloading of sharpness data to a computer (not shown).

When the digital sharpness measurement gauge is used to measure pin tip sharpness in a pin mat, the digital sharpness information is used to generate a contour map of a pin tip sharpness across the mat This map is generated by sampling pin tip sharpness using the digital sharpness measurement gauge 310 in predetermined sampling locations on the mat. The sampling locations are suitably predetermined utilizing standard statistical means to ensure that sampling will differentiate a pin mat with usable pin tip sharpness from a pin mat with insufficiently sharp pins. A sampling mask (not shown) the size of a pin mat, with sampling holes large enough to accommodate the aperture tube 24 at the predetermined sampling locations is placed over a pin mat, allowing the predetermined sampling locations to be quickly and repetitively accessed by an operator measuring pin tip sharpness.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for measuring sharpness of the tip of an object, the method comprising:
    receiving a tip of an object in an end of the tube;
    deflecting a plunger a finite distance through the tube with the tip of the object; and
    deriving a measurement of sharpness of the tip of the object responsive to the deflecting of the plunger wherein receiving the tip further includes positioning the tube with a sampling mask by way of at least one sampling hole in said mask.

2. The method of claim 1, further comprising:
    displaying the measurement of the sharpness of the tip of the object.

3. The method of claim 2, wherein displaying the measurement of the sharpness of the tip of the object further includes displaying the measurement digitally.

4. The method of claim 2, wherein displaying the measurement of the sharpness of the tip of the object further includes displaying the measurement with an analog indicator.

5. The method of claim 1, further comprising:
    communicating the measurement of the sharpness of the tip of the object to a computer.

6. The method of claim 1, wherein receiving the tip includes inserting the tube over the tip of the object.

7. The method of claim 1, wherein the object includes a pin.

8. The method of claim 7, wherein the pin is one of a plurality of pins arranged in a matrix pattern.

9. The method of claim 7, wherein receiving the tip further includes positioning the tube with a sampling mask with a plurality of statistically predetermined sampling locations.

10. The method of claim 9, further comprising:
    generating a contour map of pin sharpness.

11. The method of claim 1, wherein the object defines one of an edge and a corner.

12. A gauge for measuring sharpness of the tip of an object, the gauge comprising:
    a tube having an end of the tube, the end of the tube being defined to receive the tip of an object therethrough;
    a plunger disposed within the tube, the plunger being deflectable a finite distance through the tube by the tip of an object; and
    means for deriving a measurement of sharpness of the tip of the object responsive to the deflection of the plunger a sampling mask comprising a plurality of sampling holes for receiving the tip of said object.

13. The gauge of claim 12, further comprising:
    means for communicating the measurement of sharpness of the tip of the object to a computer.

14. The gauge of claim 12, further comprising:

an indicator to indicate the measurement of the sharpness of the object.

15. The gauge of claim 14, wherein the indicator includes a digital display.

16. The gauge of claim 14, wherein the indicator includes an analog indicator.

17. The gauge of claim 16, wherein the analog indicator includes a dial.

18. The gauge of claim 12, further comprising:

a holder arranged to position the tube in alignment with the object.

19. The gauge of claim 12, further comprising:

a guide, attached to the tube, arranged for guiding the object into the tube.

20. A gauge for measuring sharpness of the tip of a pin, the gauge comprising:

a tube having an end of the tube, the end being defined to receive the tip of a pin therethrough;

a plunger disposed within the tube, the plunger being deflectable a finite distance through the tube by the tip of the pin; and an indicator arranged to derive and display a measurement of sharpness of the tip of the pin responsive to the finite distance of deflection of the plunger a sampling mask comprising a plurality of sampling holes for receiving the tip of said pin.

21. The gauge of claim 20, wherein the indicator includes an analog indicator.

22. The gauge of claim 20, wherein the indicator includes a digital indicator.

23. The gauge of claim 20, further comprising:

means for communicating the measurement of sharpness of the tip of the object to a computer.

\* \* \* \* \*